UNITED STATES PATENT OFFICE.

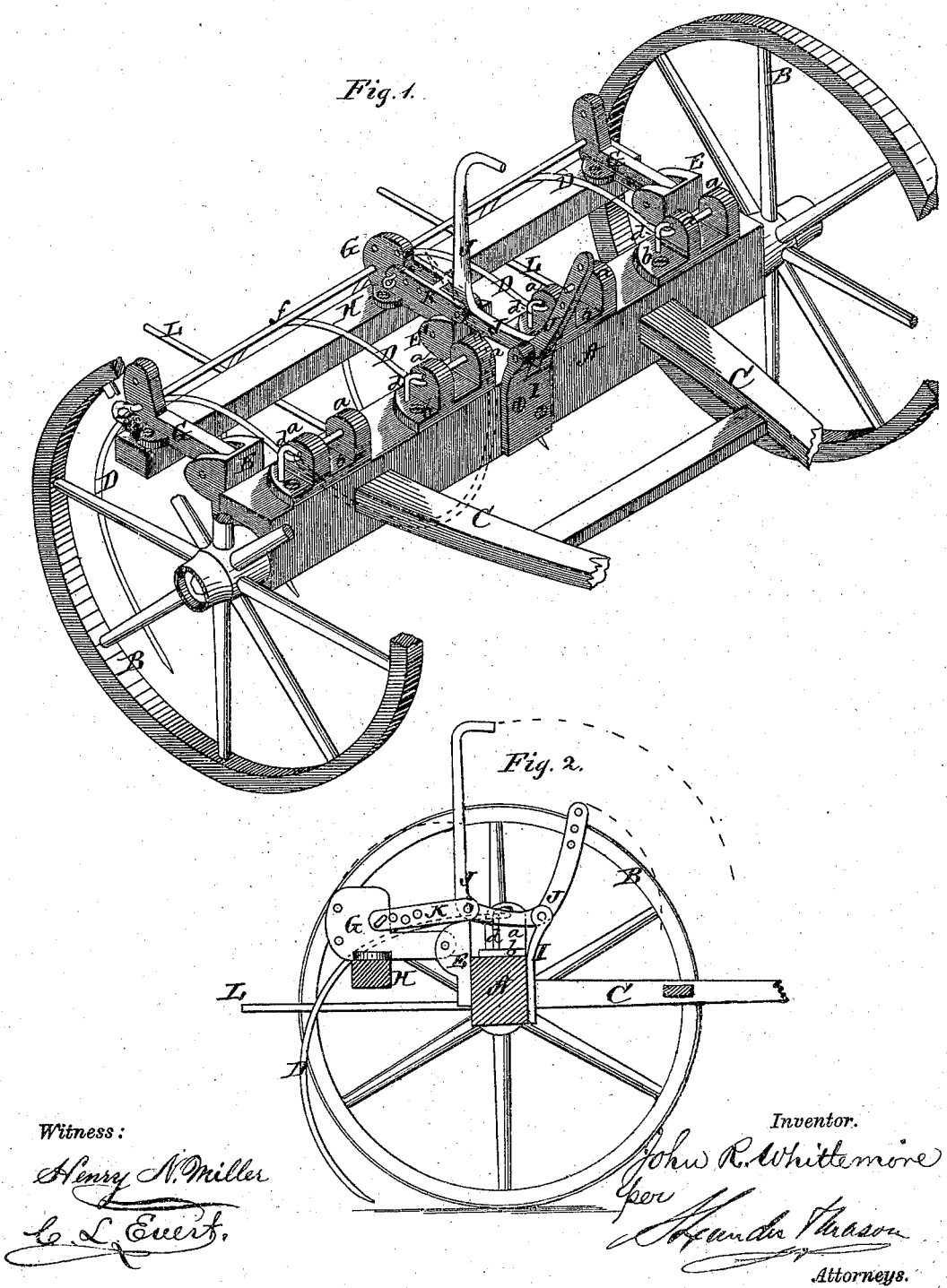

JOHN R. WHITTEMORE, OF CHICOPEE FALLS, MASSACHUSETTS.

IMPROVEMENT IN HORSE HAY-RAKES.

Specification forming part of Letters Patent No. 133,280, dated November 19, 1872.

*To all whom it may concern:*

Be it known that I, JOHN R. WHITTEMORE, of Chicopee Falls, in the county of Hampden and in the State of Massachusetts, have invented certain new and useful Improvements in Horse Hay-Rakes; and do hereby declare that the following is a full, clear, and exact description thereof, reference being had to the accompanying drawing and to the letters of reference marked thereon making a part of this specification.

The nature of my invention consists in the construction and arrangement of a horse hay-rake, as will be hereinafter more fully set forth.

In order to enable others skilled in the art to which my invention appertains to make and use the same, I will now proceed to describe its construction and operation, referring to the annexed drawing, in which—

Figure 1 is a perspective view of my horse hay-rake, and Fig. 2 is a transverse section of the same.

A represents the axle with a wheel, B, at each end, and the shafts c c firmly attached to it. D D represent the rake-teeth, made of the usual material and in the usual manner. The inner end of each tooth is bent at right angles so as to run parallel with the axle, and is inserted through two ears, a a, projecting upward from a plate, b, which is secured on the upper side of the axle A. The tooth is held in the ears a a by means of a hook or bent rod, d, inserted in the plate b; but by turning the tooth half over or to the front of the axle (or rake-head, as the axle actually is) it can readily slip out of its place under the hook d. At each end and in the center on the rear side of the axle A are secured three plates, E E E', each having two rearward-projecting ears, between which are pivoted the front ends of L-shaped arms G G G'. The three arms G G G' are firmly secured on the upper side of a bar, H, running parallel with the axle, and upon which the teeth D D rest, as shown in the drawing. Through the upward-projecting ends of each of the L-shaped arms G G G' is passed a rod, f, which holds the teeth and prevents them from rising only a certain distance, and that distance can be changed by moving the rod in different holes on the arms. This is of great importance, as it is very necessary to have the teeth play more or less, as the quantity of hay to be raked is large or small. Or the rod may be placed so near to the teeth that they will have no play at all, thereby keeping them down close to the ground. It will be noticed that although the rake-teeth are hinged entirely independent of each other, still one single rod holds them in place, and they can all be removed, as above described, by first withdrawing said rod f. To a plate, I, attached to the front side in the center of the axle A, is hinged or pivoted an angular lever, J, for raising the teeth from the ground. This lever is constructed as shown in Fig. 2, the front end forming a foot-lever, and the rear end a hand-lever, so that the driver can use either his hand or foot, or both if necessary, to raise the rake. From this lever J a hinged or pivoted casting, K, connects with the upper end of the center arm G'. It will be seen that the teeth hang upon or are supported by the lever, and by having several holes in the connection K, as shown, the teeth may be let down on the ground, or arranged so as not to touch the ground, which is of importance in gleaning and in soft land. It will be seen that the central casting E' is extended upward sufficiently far to form a support for the hinged casting K to rest upon, so that the casting and the levers are prevented from dropping too low down, and hence the lever does not lock in any position; but it is always easy to raise. From the rear side of the axle A extend rods L L to clear the hay from the teeth when the same are raised.

Having thus fully described my invention, what I claim as new, and desire to secure by Letters Patent, is—

1. The adjusting-rod f, in combination with the perforated L-shaped arms G G, bar H, and teeth D, all substantially as set forth.

2. The casting E' extended above the axle, in combination with the levers J J, hinged bar K, and casting G', all substantially as and for the purposes herein set forth.

In testimony that I claim the foregoing I have hereunto set my hand and seal this 26th day of August, 1872.

JOHN R. WHITTEMORE. [L. S.]

Witnesses:
    A. N. MARR,
    J. W. BURGESS.